(12) United States Patent
Sapp (10) Patent No.: US 7,949,420 B2
(45) Date of Patent: May 24, 2011

(54) METHODS AND GRAPHICAL USER INTERFACES FOR DISPLAYING BALANCE AND CORRELATION INFORMATION OF SIGNALS

(75) Inventor: Markus Sapp, Pinneberg (DE)

(73) Assignee: Apple Inc., Cupertino, CA (US)

(*) Notice: Subject to any disclaimer, the term of this patent is extended or adjusted under 35 U.S.C. 154(b) by 1121 days.

(21) Appl. No.: 11/712,642

(22) Filed: Feb. 28, 2007

(65) Prior Publication Data

US 2008/0204456 A1     Aug. 28, 2008

(51) Int. Cl.
*G06F 17/00* (2006.01)
(52) U.S. Cl. .......................................................... 700/94
(58) Field of Classification Search .................. 700/94
See application file for complete search history.

(56) References Cited

U.S. PATENT DOCUMENTS

| | | | | |
|---|---|---|---|---|
| 4,691,358 | A * | 9/1987 | Bradford | 381/12 |
| 5,751,819 | A * | 5/1998 | Dorrough | 381/56 |
| 6,021,204 | A * | 2/2000 | Eastty | 381/12 |
| 6,222,549 | B1 | 4/2001 | Hoddie | |
| 6,977,653 | B1 * | 12/2005 | Cleary et al. | 345/440 |
| 7,610,110 | B1 * | 10/2009 | Johnston | 700/94 |
| 2005/0047605 | A1 * | 3/2005 | Lee et al. | 381/56 |
| 2005/0226429 | A1 | 10/2005 | Hollowbush et al. | |

FOREIGN PATENT DOCUMENTS

| | | |
|---|---|---|
| EP | 1 132 720 A2 | 9/2001 |
| GB | 2 286 885 A | 8/1995 |
| GB | 2 319 346 A | 5/1998 |

OTHER PUBLICATIONS

PCT International Search Report and Written Opinion for PCT International Appln No. PCT/US2008/002188, mailed on Jun. 25, 2008 (13 pages).

Tektronix: "Monitoring Surround-Sound Audio" *Internet Article*, Jul. 1, 2005, pp. 1-32, Retrieved from Internet: http://www.2tek.com/cmsreplive/tirep/2214/2006.03.27.12.02.15_2214_en.pdf.

* cited by examiner

*Primary Examiner* — Suhan Ni
*Assistant Examiner* — Paul McCord
(74) *Attorney, Agent, or Firm* — Blakely, Sokoloff, Taylor & Zafman LLP (57) ABSTRACT

The present invention relates to a method of displaying balance and correlation information of at least a pair of a first channel signal and a second channel signal. According to the present invention, the method of displaying balance and correlation information of at least a pair of a first channel signal and a second channel signal comprises the operations of obtaining a balance signal of the first channel signal and the second channel signal, obtaining a correlation signal of the first channel signal and the second channel signal, and displaying the balance signal and the correlation signal on a single scale. The present invention may be implemented in any number of ways including a method, a computer program product, a computer-readable medium containing a program code according to the method, a graphical user interface and a computer system.

28 Claims, 8 Drawing Sheets

METHODS AND GRAPHICAL USER INTERFACES FOR DISPLAYING BALANCE AND CORRELATION INFORMATION OF SIGNALS

FIELD OF THE INVENTION

This invention relates to the field of displaying balance and correlation information of at least a pair of a first channel signal and a second channel signal. The invention relates more specifically to methods of displaying balance and correlation information, to computer program products configured to execute on a data processing device having a processor and a memory, said computer programs providing for a display of balance and correlation information of at least a pair of first channel signals and a second channel signal, graphical user interfaces for displaying balance and correlation information of at least a pair of a first channel signal and a second channel signal and data processing systems including such graphical user interfaces.

BACKGROUND

When working with signals of at least a pair of a first channel and a second channel, in particular when working with audio signals with more than one channel, e.g. stereo, quadraphonic or surround signals, it is often important to track the correlation between the signals of the different channels. This is for example of importance when one has to check mono-compatibility of a stereo-audio signal that is intended for airplay. Another aspect that is of interest with stereo and/or multi-channel signals is the level balance between the signals of the different channels.

Existing applications for displaying audio data (e.g. computer software applications and dedicated hardware such as music synthesizers) provide numerous tools for displaying audio data. In particular, the display of the relation of energy of two signals of two different stereo-audio channels, i.e. the display of a balance of a first channel and a second channel signal, is well known.

However, there is a need for a method and apparatus for displaying balance and correlation information of at least a pair of a first channel signal and a second channel signal in a way that an intended sonic impression can be judged only on the basis of such an advanced display.

SUMMARY OF THE DESCRIPTION

At least certain embodiments of the present invention provide for a method and an apparatus, a computer program product and a data processing system displaying balance and correlation information of at least a pair of a first channel signal and a second channel signal according to a sensual impression that normally can only be achieved by e.g. listening to these signals in order to facilitate the judgment of the balance and correlation information of these signals.

The present invention thus relates to a method of displaying balance and correlation information of at least a pair of a first channel signal and a second channel signal. The present invention may be implemented in any number of ways including a method, a computer program product, a computer-readable medium containing a program code according to the method, a graphical user interface and a data processing system.

Thus, the present invention in a first embodiment relates to a method of displaying balance and correlation information of at least a pair of a first channel signal and a second channel signal, the method comprising:
obtaining a balance signal of the first channel signal and the second channel signal;
obtaining a correlation signal of the first channel signal and the second channel signal;
displaying the balance signal and the correlation signal on a single scale.

In a preferred embodiment, the scale is a normalized scale displayed within a single window or portion of the same window which can be moved or closed or minimized as a single window.

Preferably, a balance indicator is generated and displayed on the normalized scale corresponding to a value of the balance signal to be displayed.

It is further preferred, in at least certain embodiments, to generate and display a correlation range indicator on the normalized scale, the correlation range indicator being coupled to the balance indicator, the width of the correlation range indicator equals the length of the normalized scale x (1-value of correlation signal), wherein in case the width of the correlation range indicator exceeds the length of the normalized scale, the exceeding ends of the widths of the correlation range indicator are folded back at the ends of the normalized scale and wherein the width of the correlation range indicator covers the same percentage of the length of the normalized scale from the balance indicator to either end of the normalized scale. The folded back parts of the widths of the correlation range indicator are preferably displayed in a contrast or alarm color, e.g. in red.

Preferably, in at least certain embodiments, obtaining the balance signal comprises detecting a running average of the first channel signal, detecting a running average of the second channel signal, comparing the detected running average of one of the first and second signal with the running average of both first and second channel signals, and calculating the normalized balance signal on the basis of the comparison.

Preferably, in at least certain embodiments, obtaining the correlation signal comprises detecting a running average of the first channel signal, detecting a running average of the second channel signal, detecting a running average of the product of the first channel signal and the second channel signal, comparing the detected running averages, and calculating the normalized correlation signal on the basis of the comparison, whereby more recent parts of the detected running averages of the first and second channel signals get higher weightings while older parts get more and more reduced weightings.

Most preferably, in at least certain embodiments, the first channel signal and the second channel signal are audio signals.

Several pairs of first and second channel signals are preferably provided, in at least certain embodiments, defining a matrix corresponding to an arrangement of several channels according to surround audio format, whereby several balance and correlation signals are displayed on several scales corresponding to several pairs of first and second channel signals.

BRIEF DESCRIPTION OF THE DRAWINGS

Embodiments, aspects, examples and features of the present invention will now be described without undue limitation of the spirit and scope thereof with reference to the accompanying drawings in which:

FIG. 7a to FIG. 7f show schematically different states of the balance and correlation information displayed according to a preferred embodiment of the invention;

DETAILED DESCRIPTION

Figure 1:
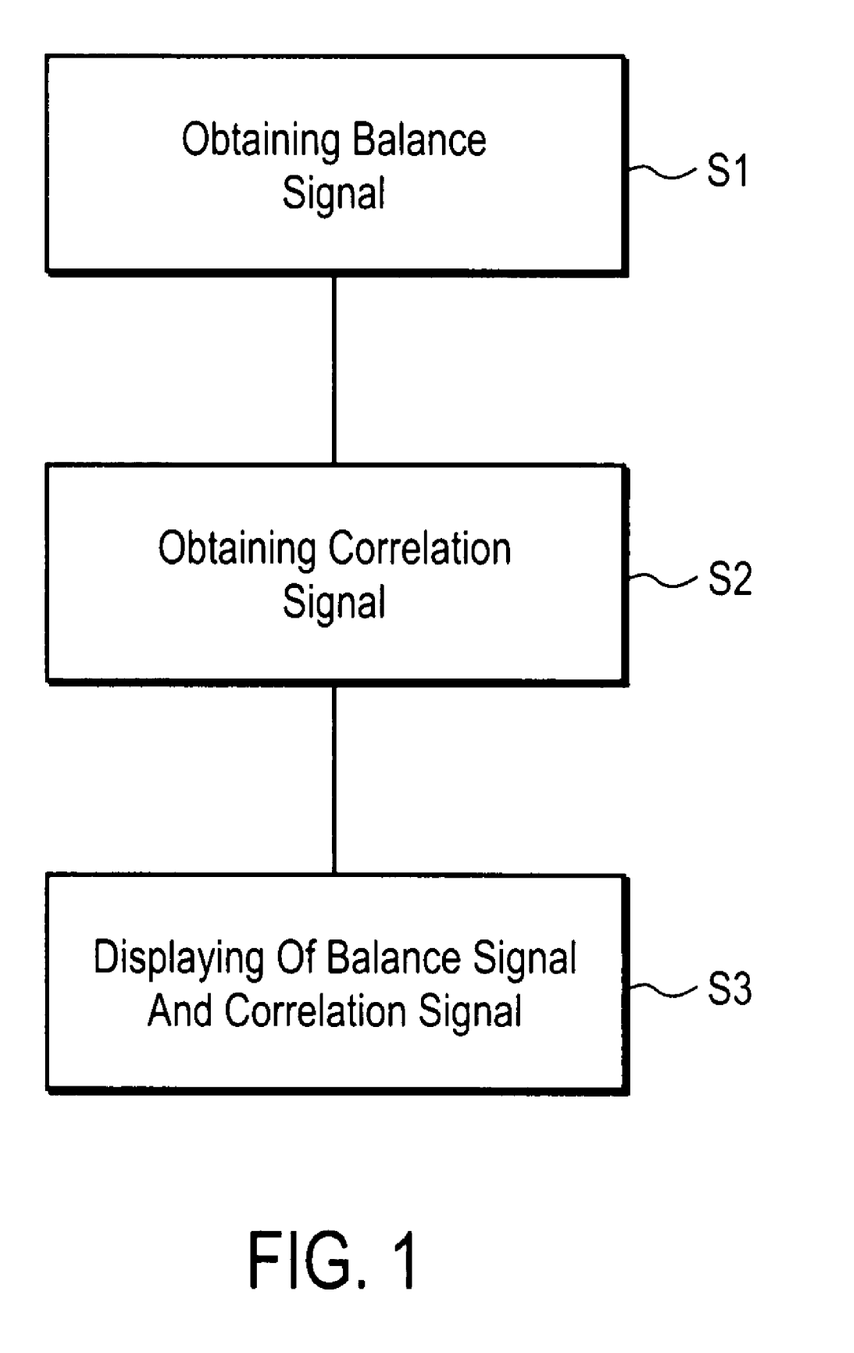
FIG. 1 illustrates a method of an embodiment according to the present invention.

FIG. 1 illustrates an example of the method of displaying balance and correlation information of at least a pair of a first channel signal and a second channel signal according to an embodiment of the invention.

At least certain embodiments of the present invention combine displaying a balance signal and a correlation signal in a single, compact and easy-to-understand scale.

In operation S1, a balance signal of the first channel signal and the second channel signal is obtained. In operation S2, a correlation signal of the first channel signal and the second channel signal is obtained. Finally, in operation S3, the balance signal and the correlation signal is displayed on a single display. This display is preferably carried out graphically on computer display means.

The balance signal and the correlation signal are obtained by using the following average-values floating in time:

$$A11 = Avrg(s1*s1)$$

$$A22 = Avrg(s1*s2)$$

$$A12 = Avrg(s1*s2)$$

s1 being the momentary amplitude of the first channel signal, s2 being the momentary amplitude of the second channel signal and Avrg being an average floating in time.

The correlation signal with a range [−1; +1] is calculated as follows:

$$C = sqrt(C2) \text{ for } C2 \geq 0$$

or $$C = -sqrt(-C2) \text{ for } C2 < 0$$

with:

$$C2 = A12*|A12|/(A11*A22)$$

The balance signal B01 with a range [0; 1] is calculated as follows:

$$B01 = A22/(A11+A22)$$

The value of B01 being 0.0 if s1 is active and s2 is mute, the value of B01 being 0.5 if the intensity of s1 is the same as the intensity of s2, and the value of B01 being 1.0 if s1 is mute and s2 is active.

For internal calculations, the balance signal B01 with a range [0; 1] may be converted to a balance signal B with a range [−1; +1]:

$$B = -1.0 + 2.0*B01$$

The value of B being −1.0 if s1 is active and s2 is mute, the value of B being 0.0 if the intensity of s1 is the same as the intensity of s2, and the value of B being +1.0 if s1 is mute and s2 is active.

According to the above, the values of A11, A22 and A12 are used for calculating the correlation signal as well as the balance signal.

Figure 2:
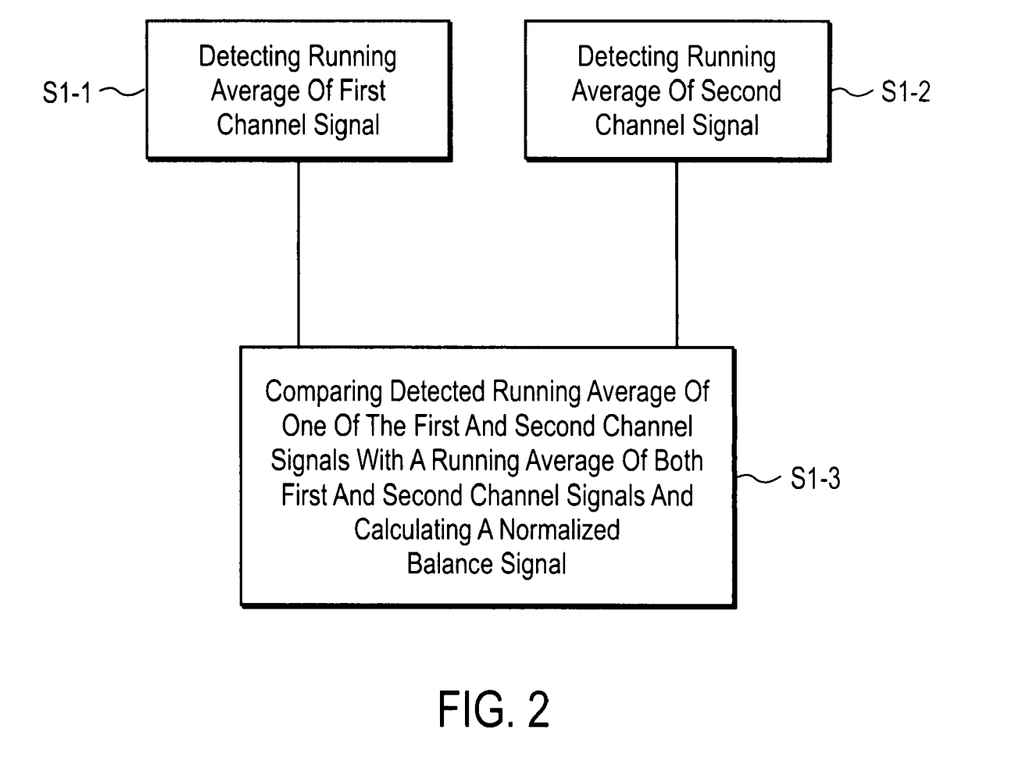
FIG. 2 illustrates a method for obtaining a balance signal of the present invention in greater detail according to an embodiment of the invention.

FIG. 2 illustrates an example of a method of obtaining the balance signal of operation S1 in greater detail according to a preferred embodiment of the inventions.

In operation S1-1, a running average of a first channel signal is detected. In operation S1-2, a running average of the second channel signal is detected. The detections of operations S1-1 and S1-2 preferably take place simultaneously in one embodiment.

In operation S1-3, the detected running average of one of the first and second channel signals is compared with the running average of both first and second channel signals and a normalized balance signal is calculated on the basis of this comparison according to the equations above.

In the procedure according to FIGS. 1 and 2, the balance of the first channel signal and the second channel signal is determined and the balance signal is obtained based on the relation of the energy of the two signals. If the channels have the same energy, the balance is centered.

Figure 3:
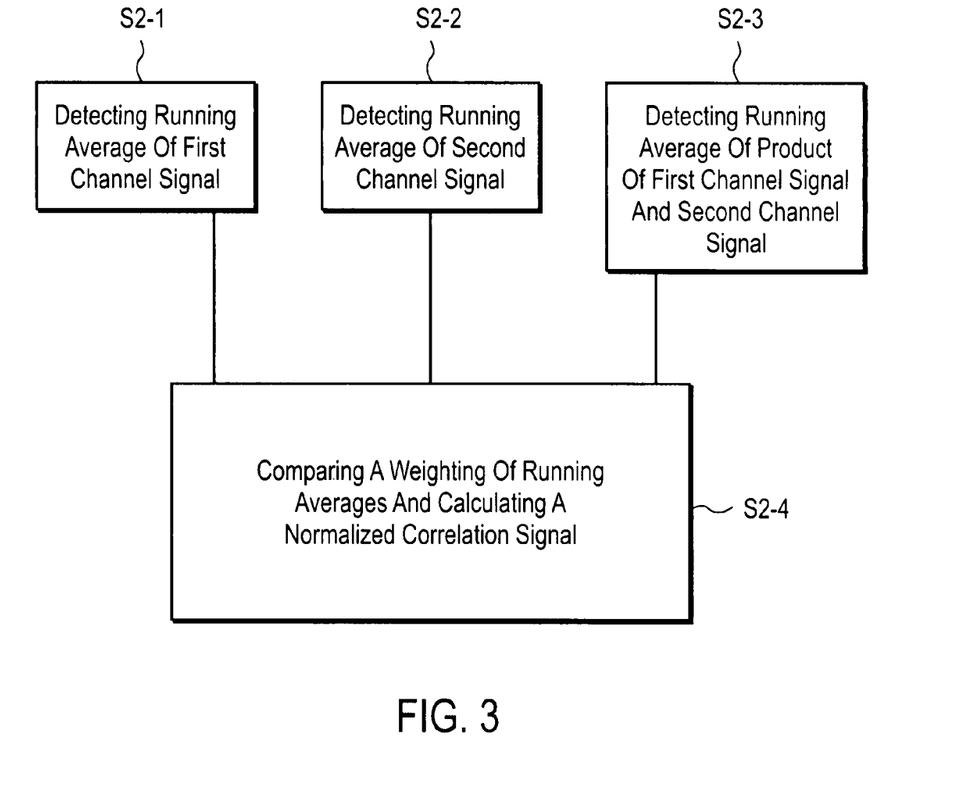
FIG. 3 illustrates a method for obtaining a correlation signal of the present invention in greater detail according to an embodiment of the invention.

FIG. 3 illustrates operation S2 of FIG. 1, i.e. obtaining a correlation signal, in greater detail according to a preferred embodiment of the invention.

In operation S2-1, the running average of the first channel signal is detected. In operation S2-2, the running average of the second channel signal is detected. In operation S2-3 the running average of the product of the first channel signal and the second channel signal is detected.

The detection of operations S2-1, S2-2 and S2-3 can be conducted simultaneously, and in particular simultaneously with the detection of operations S1-1 and S1-2 (see FIG. 2) in one embodiment.

In operation S2-4, the running average of the first channel signal is compared with the running average of the second channel signal and the running average of the product of the first channel signal and the second channel signal. Furthermore, the running averages of the first channel signal, the second channel signal and the running average of the product of the first channel signal and the second channel signal are rated, whereby more recent parts of the detected running averages get higher weights which are used in a weighted averaging process, while older parts get more and more reduced weights. Then, a normalized correlation signal is calculated on the basis of this comparison according to the equations above.

Figure 4:
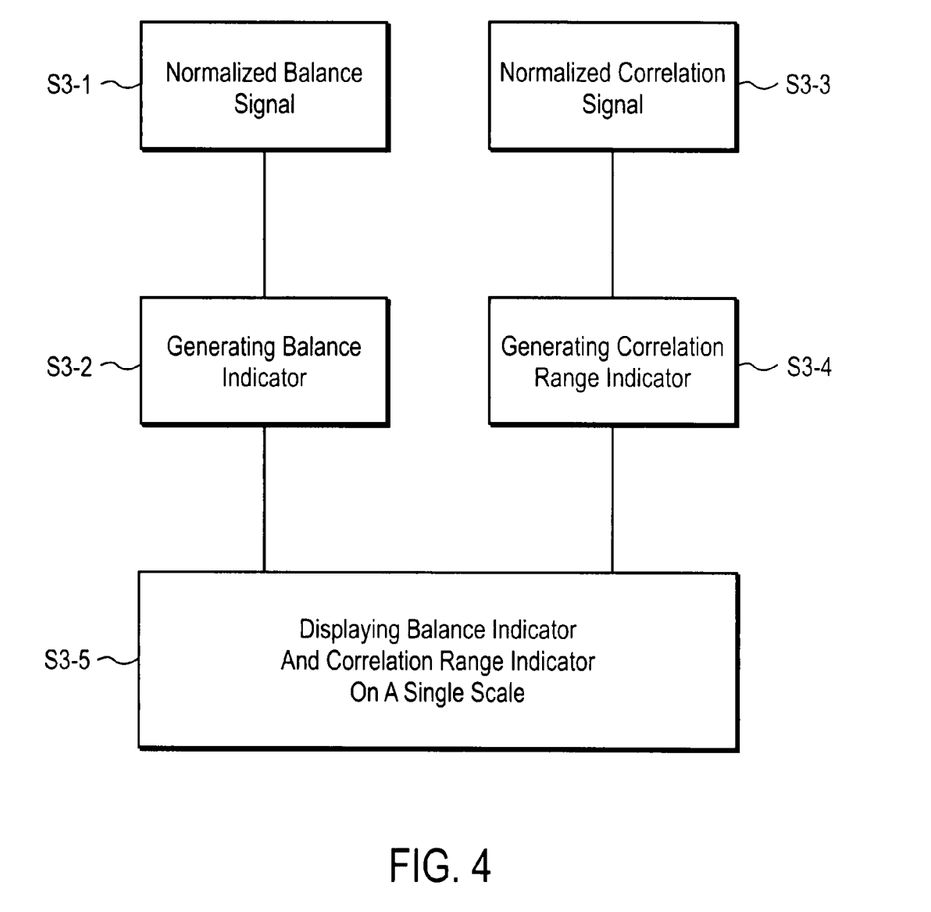
FIG. 4 illustrates a method for displaying the balance signal and a correlation signal according to the invention in greater detail according to an embodiment of the invention.

FIG. 4 illustrates an example of a method of displaying the balance signal and the correlation signal according to operation S3 in FIG. 1 in greater detail according to a preferred embodiment of the invention.

According to FIG. 4, in operation S3-1 a normalized balance signal is provided and forwarded in order to generate a balance indicator on the basis of the normalized balance signal in operation S3-2.

Parallel thereto, in operation S3-3, the normalized correlation signal is provided and forwarded in order to generate a correlation range indicator in operation S3-4.

In operation S3-5, the balance indicator and correlation range indicator are displayed on a single scale. The preferred simultaneous display is such that the same time axis is used for both indicators so that on any given point the balance and the correlation are shown juxtaposed.

The single scale is preferably a normalized scale with a length ranging from −1 to 1, −1 representing the balance signal being completely determined by the first channel signal, 1 representing the balance signal being completely determined by the second channel signal and 0 representing the balance signal being to the same extent determined by the first and second channel signals. The balance indicator is generated and displayed on this normalized scale corresponding to a value of the balance signal to be displayed.

The correlation range indicator is also generated and displayed on the same normalized scale and it is preferably coupled to the balance indicator.

The correlation range indicator preferably has a width that equals the length of the normalized scale x (1-value of correlation signal), wherein in case the width of the correlation range indicator exceeds the length of the normalized scale, the exceeding ends of the width of the correlation range indicator are folded back at the ends of the normalized scale, and wherein the width of the correlation range indicator covers the same percentage of the length of the normalized scale from the balance indicator to either end of the normalized scale. The folded back parts of the widths of the correlation range indicator are preferably displayed in a contrast or alarm color, e.g. in red. The value of the correlation signal is normalized with a range of −1 to 1, −1 representing equal shape of the first channel signal and the second channel signal, but different signs of the signals, 0 representing no similarity of the first channel signal and the second channel signal at all and 1 representing equal shape of the first channel signal and the second channel signal regardless of the levels of the signals.

Figure 5:
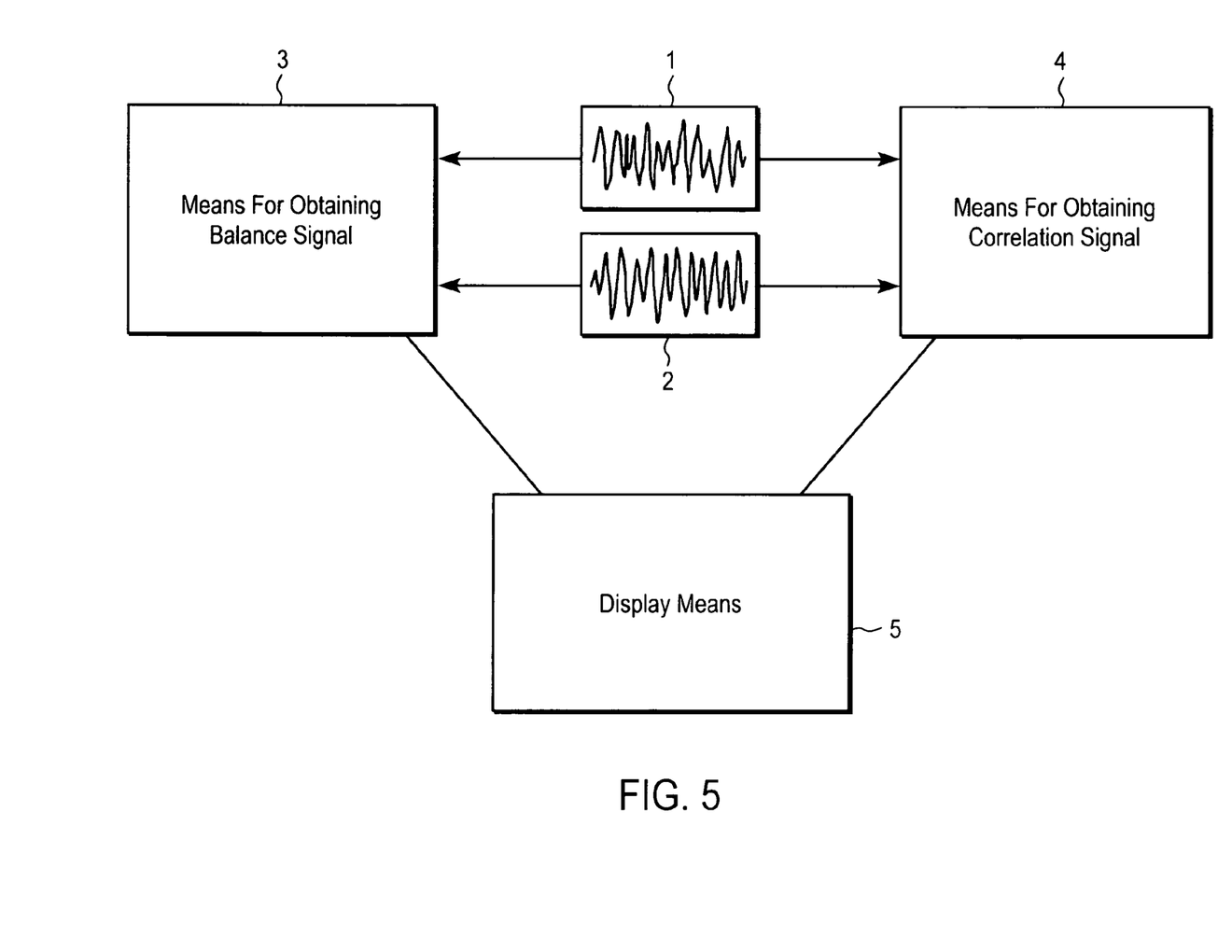
FIG. 5 illustrates a graphical user interface (GUI) according to an embodiment of the present invention.

FIG. 5 illustrates a graphical user interface for displaying balance and correlation information according to an embodiment of the invention.

According to FIG. 5, the graphical user interface of the invention comprises means for obtaining a balance signal 3 of a first channel signal 1 and of a second channel signal 2, means for obtaining a correlation signal 4 of the first channel signal 1 and the second channel signal 2, and display means 5 with a single scale displaying the balance signal and the correlation signal on the single scale. These means may be either software based or hardware-only based structures.

Figure 6:
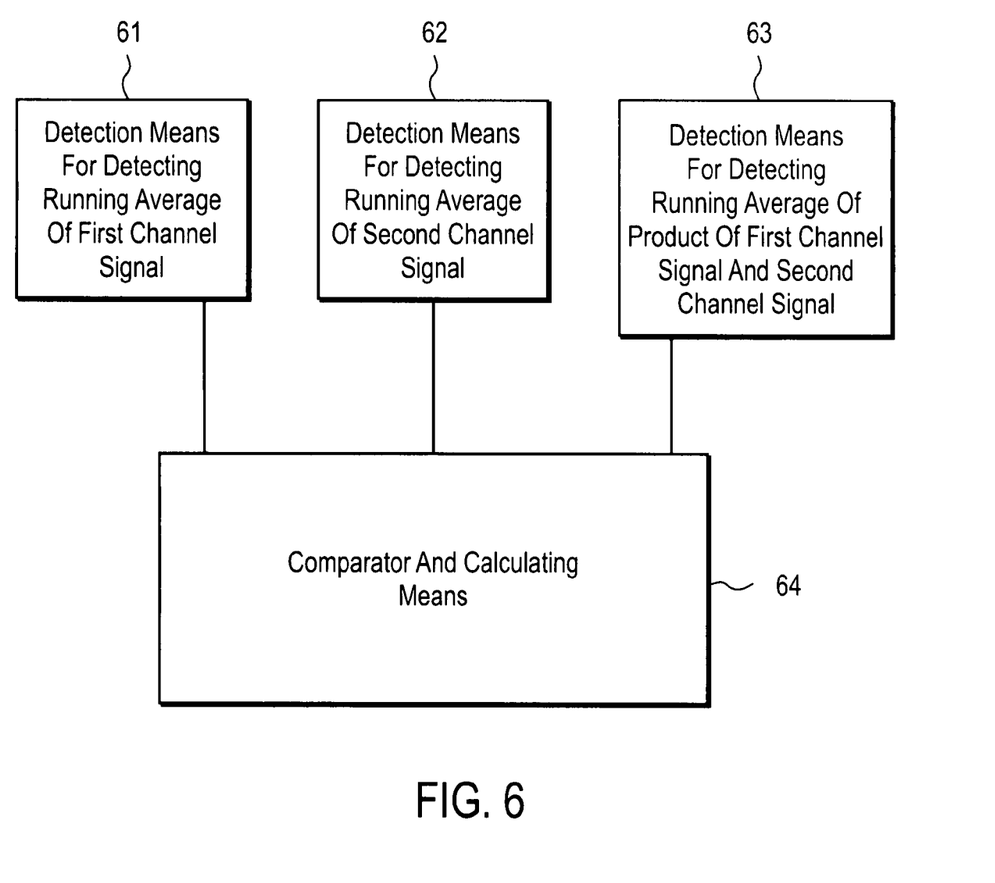
FIG. 6 illustrates a graphical user interface of the present invention in greater detail according to a preferred embodiment of the invention.

FIG. 6 illustrates the means for obtaining the balance signal 3 and means for obtaining the correlation signal 4 in greater detail according to a preferred embodiment of the invention. Preferably, the means for obtaining the balance signal 3 and the means for obtaining the correlation signal 4 can be realized in a single unit with the features as illustrated in FIG. 6.

According to FIG. 6, this unit comprises detection means 61 for detecting the running average of a first channel signal, detection means 62 for detecting the running average of the second channel signal and detection means 63 for detecting the running average of the product of the first channel signal and the second channel signal. Comparator and calculating means 64 are provided for comparing the detected running averages, and for comparing the detected running averages.

The comparator and calculating means 64 carry out these comparisons on the basis of the data inputted to the comparator and calculating means 64 from the detection means 61, the detection means 62 and the detection means 63, and calculate the normalized balance signal on the basis of the respective comparison and calculate the normalized correlation signal on the basis of the respective comparison, whereby more recent parts of the detected running averages of the first and second channel signal get higher weights while older parts get more and more reduced weights.

FIGS. 7a to 7f show a display of the balance signal and the correlation signal on a single scale according to an embodiment of the invention.

Figure 7:
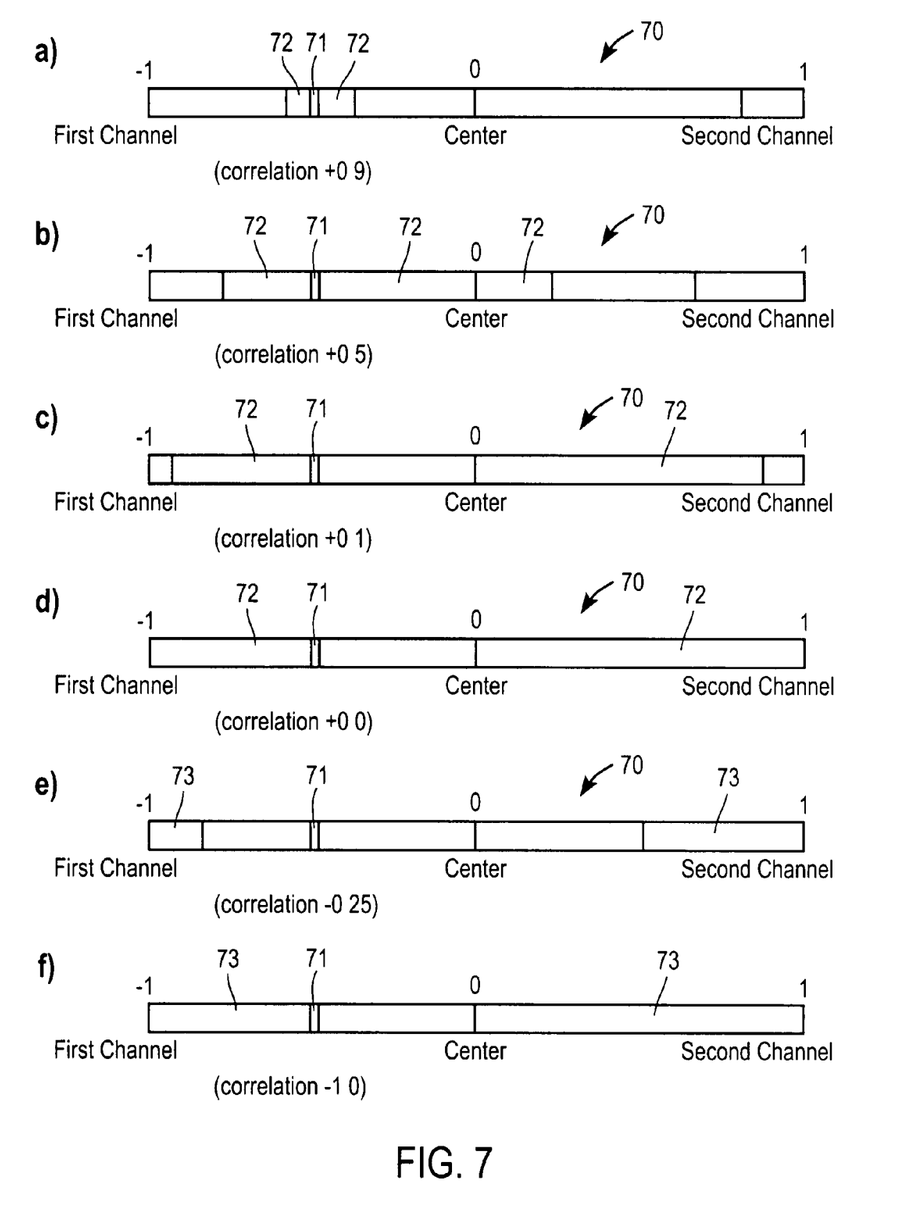

FIGS. 7a to 7f differ from each other in the value of correlation (ranging from +0.9 in FIG. 7a to −1.0 in FIG. 7f).

The display of FIG. 7a has a single normalized scale 70 with a length running from −1 to 1, −1 representing the balance signal being completely determined by the first channel signal, 1 representing the balance signal being completely determined by the second channel signal and 0 representing the balance signal being to the same extent determined by the first and second channel signals.

This normalized scale 70 basically corresponds to a balance meter with its direct correspondence to the sound placement according to the balance signal, but it also incorporates the display of the correlation signal providing for a similar relationship to the sound location, i.e. strongly correlated signals on two channels (correlation close to +1) cause a sharply located virtual sound source between, for example, stereo speakers, while mostly uncorrelated signals (correlation close to 0) produce a blurred sonic impression. Therefore, the display of FIG. 7a shows a correlation with a value of +1 as a sharp correlation range indicator, values close to 0 as a correlation range indicator with a "blurred area". Negative correlations produce unnatural (but still blurred) sonic impressions and are therefore indicated as "blurred area" with a contrast-colored "problem indicator" in form of the folded back parts of the correlation signal/correlation range indicator.

In FIGS. 7a to 7f, a balance indicator 71 is shown, generated and displayed on the normalized scale 70 corresponding to a value of the balance signal to be displayed. All the examples in FIGS. 7a to 7f show a scenario, where the first channel is louder than the second channel. Therefore, the balance marker is positioned closer to the first channel, i.e. closer to −1 on the normalized scale 70.

In at least certain embodiments, a correlation range indicator 72 is generated and displayed on the normalized scale corresponding to a value of the correlation signal, and it is coupled to the balance indicator as shown in FIGS. 7a through 7f. The width of the correlation range indicator equals the length of the normalized scale x (1-value of correlation signal), wherein in case the width of the correlation range indicator exceeds the length of the normalized scale (which is the case in the examples of FIGS. 7e and f), the exceeding ends of the width of the correlation range indicator 73 are folded back at the ends of the normalized scale 70.

Furthermore, in all examples according to FIGS. 7a to 7f, the width of the correlation range indicator 72, 73 covers the same percentage of the length of the normalized scale 70 from the balance indicator 71 to either end of the normalized scale 70.

The value of the correlation signal is represented by the width of the correlation range indicator 72, 73 and in one embodiment is normalized with a range of −1 to 1, wherein the value of −1 represents equal shape of the first channel signal and the second channel signal, but different signs of the signals, and the value of 0 represents no similarity of the first channel signal and the second signal at all and the value of 1 represents equal shape of the first channel signal and the second channel signal regardless of the levels of the signals.

The width of the correlation range indicator represents the sonic impression. For example, in case the width of the correlation range indicator is rather small (for example in FIG. 7a), the sonic impression would be sharply located with a virtual sound source located between the first channel and the second channel. In case the width of the correlation range indicator grows with the correlation approaching 0 (see FIGS. 7b to 7d), this corresponds to an increasingly blurred sonic impression.

In FIGS. 7e and 7f, the width of the correlation range indicator exceeds the length of the normalized scale 70. This results in a display, where the ends of the correlation range indicator 73 are folded back at the ends of the normalized scale 70. This is the case with correlation values smaller than 0.0. Since negative correlations are mostly undesired, these folded back parts of the correlation range indicator 73 can be displayed in a different color, for example they can be displayed as red areas.

As mentioned, the first channel signal and the second channel signal are preferably audio signals, such as audio stereo signals.

Figure 8:
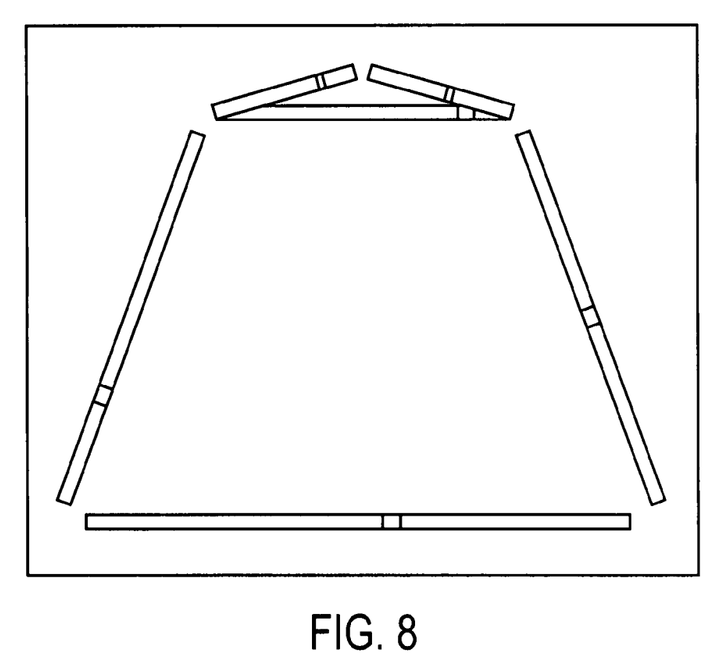
FIG. 8 shows an arrangement of six display units in a matrix according to a preferred embodiment of the present invention.

However, for multi-channel audio signals, a matrix of multiple pairs of first and second channel signals can be combined, so that multiples of scales corresponding to pairs of first and second channel signals are arranged according to the actual speaker positions. Several pairs of first and second channel signals are preferably provided, defining a matrix corresponding to an arrangement of several channels according to a surround audio format, whereby several balance and correlation signals are displayed on several scales corresponding to several pairs of first and second channel signals. A typical set-up with six pairs of first and second channel signals and six corresponding scales corresponding to an arrangement of six channels according to 5.1 surround audio format is shown in FIG. 8. Even though only six pairs of the five non-LFE channels in 5.1 are shown, it will be understood that embodiments of the invention are not to be restricted to six pairs and embodiments may incorporate and display more than these six pairs. E.g. with the channels L, R, C, Ls and Rs combinations could be L-C, R-C, L-R, L-Ls, R-Rs, Ls-Rs, L-Rs, Ls-R, Ls-C, Rs-C.

The small dark marks represent the balance indicator of each pair of channels, while the light grey areas represent the width of the correlation range indicators of each pair of channel signals. The spotlight-like highlighted area positioned slightly out of the center indicates the overall balance of the surround signal. Additionally (but not shown in FIG. 8), the brightness of each scale can be adapted according to the relative energy of the two channels of the respective scale compared to the overall energy, so that the balance/correlation of more important channel pairs gets displayed brighter, whilst the soft or even silent channel pairs are displayed darker.

Figure 9:
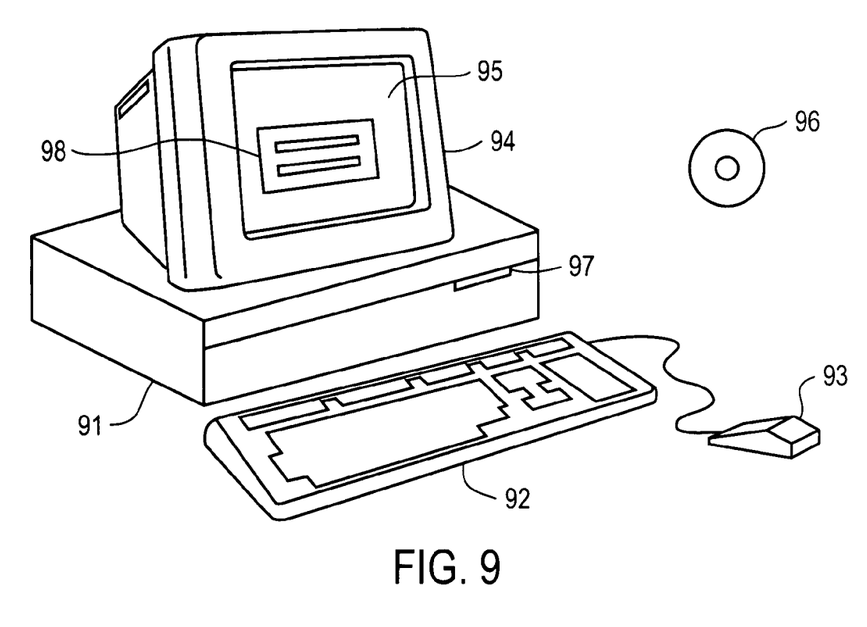
FIG. 9 illustrates a computer system incorporating a graphical user interface in accordance with an embodiment of the present invention.

FIG. 9 illustrates a data processing system such as a computer system which may include a graphical user interface as discussed above. The computer system comprises a screen 95 on a display monitor 94 which is connected to a processing system 91 incorporating a processor and a memory such as a semiconductor memory (e.g. RAM) and/or a magnetic memory (e.g. a hard drive 97). The computer system also includes a mouse 93 and a keyboard 92, both connected electrically to the processing system.

On the screen 95, the graphical user interface 98 according to the present invention is shown.

The processing system 91 includes, in one embodiment, system computer software for controlling the computer system. The software also includes control of the graphical user interface. The software may be downloaded from a server through a network or stored on an optical media, such as CD-ROM 96.

A result of at least certain embodiments of the invention may be a data file, created through one of the methods described herein, which may be stored on a storage device of a data processing system. The data file may be an audio data file, in a digital format, which may be used to create sound by playing the data file on a system which is coupled to audio transducers, such as speakers.

One or more of the methods described herein may be implemented on a data processing system which is operable to execute those methods. The data processing system may be a general purpose or special purpose computing device, or a desktop computer, a laptop computer, a personal digital assistant, a mobile phone, an entertainment system, a music synthesizer, a multimedia device, an embedded device in a consumer electronic product, or other consumer electronic devices. In a typical embodiment, a data processing system includes one or more processors which are coupled to memory and to one or more buses. The processor(s) may also be coupled to one or more input and/or output devices through the one or more buses. Examples of data processing systems are shown and described in U.S. Pat. No. 6,222,549, which is hereby incorporated herein by reference.

The one or more methods described herein may also be implemented as a program storage medium which stores and contains executable program instructions for, when those instructions are executed on a data processing system, causing the data processing system to perform one of the methods. The program storage medium may be a hard disk drive or other magnetic storage media or a CD or other optical storage media or DRAM or flash memory or other semiconductor storage media or other storage devices.

The foregoing description has been given by way of example only and it will be appreciated by a person skilled in the art that modifications can be made without departing from the scope of the present invention.

What is claimed is:

1. A method of displaying balance and correlation information of at least a pair of a first channel signal and a second channel signal, the method comprising:
    obtaining by a processor a balance signal of the first channel signal and the second channel signal;
    obtaining by a processor a correlation signal of the first channel signal and the second channel signal;
    displaying the balance signal and the correlation signal on a single scale on a display device, wherein ends of the displayed correlation signal are configured to fold back at the ends of the single scale when the correlation signal is negative.

2. The method of claim 1 wherein the scale is a normalized scale having a length ranging from −1 to 1, −1 representing the balance signal being completely determined by the first channel signal, 1 representing the balance signal being completely determined by the second channel signal and 0 representing the balance signal being to the same extent determined by the first and second channel signals, and a balance indicator is generated and displayed on the normalized scale corresponding to a value of the balance signal to be displayed.

3. The method of claim 2 wherein in the displaying a correlation range indicator having a width is generated and displayed on the normalized scale and is coupled to the balance indicator, wherein the correlation range indicator is displayed along the length of the normalized scale x, wherein the width of the correlation range indicator is equal to −1-value of correlation signal wherein in case the width of the correlation range indicator exceeds the length of the normalized scale the exceeding ends of the correlation range indicator are folded back at the ends of the normalized scale and wherein the width of the correlation range indicator covers the same percentage of the length of the normalized scale from the balance indicator to either end of the normalized scale, the value of the correlation signal being normalized with a range of −1 to 1, −1 representing equal shape of the first channel signal and the second channel signal but different signs of the signals, 0 representing no similarity of the first channel signal and the second channel signal at all and 1 representing equal shape of the first channel signal and the second channel signal regardless of the levels of the signals.

4. The method of claim 1 wherein the obtaining of the balance signal further comprises detecting a running average of the first channel signal, detecting a running average of the second channel signal, comparing the detected running average of one of the first and second channel signal with the running average of both first and second channel signals and calculating the normalized balance signal on basis of the comparison.

5. The method of claim 1 wherein the obtaining of the correlation signal further comprises detecting a running average of the first channel signal, detecting a running average of the second channel signal, detecting a running average of the product of the first channel signal and the second channel signal, comparing the detected running average of the first channel signal, the running average of the second channel signal and the detected running average of the product of the first channel signal and the second channel signal, and calculating the normalized correlation signal on basis of the comparison whereby more recent parts of the detected running averages of the first and second channel signals get higher weight while older parts get more and more reduced weight.

6. The method of claim 1 wherein the first channel signal and the second channel signal are audio signals, and wherein the folded back ends of the displayed correlation signal have graphical user interface appearance different than the rest of the displayed correlation signal.

7. The method of claim 1 wherein several pairs of first and second channel signals are provided, defining a matrix corresponding to an arrangement of channels according to surround audio format, whereby several balance and correlation signals are displayed on several scales corresponding to several pairs of first and second channel signals.

8. A data processing system having a processor and a memory, said data processing system providing for a display of balance and correlation information of at least a pair of a first channel signal and a second channel signal, wherein the processor is configured to
obtain a balance signal of the first channel signal and the second channel signal;
the processor is configured to obtain a correlation signal of the first channel signal and the second channel signal;
and the processor is configured to display the balance signal and the correlation signal on a single scale on a display device, wherein ends of the displayed correlation signal are configured to fold back at the ends of the single scale when the correlation signal is negative.

9. The data processing system of claim 8 wherein the single scale is a normalized scale having a length ranging from −1 to 1, −1 representing the balance signal being completely determined by the first channel signal, 1 representing the balance signal being completely determined by the second channel signal and 0 representing the balance signal being to the same extent determined by the first and second channel signals, wherein the processor is configured to generate and display a balance indicator on the normalized scale corresponding to a value of the balance signal to be displayed.

10. The data processing system of claim 9 wherein the processor is configured to generate and display a correlation range indicator having a width on the normalized scale and to couple the correlation range indicator to the balance indicator, wherein the correlation range indicator is displayed along the length of the normalized scale x, wherein the width of the correlation range indicator is equal to 1-value of correlation signal wherein in case the width of the correlation range indicator exceeds the length of the normalized scale the exceeding ends of the correlation range indicator are folded back at the ends of the normalized scale and wherein the width of the correlation range indicator covers the same percentage of the length of the normalized scale from the balance indicator to either end of the normalized scale, the value of the correlation signal being normalized with a range of −1 to 1, −1 representing equal shape of the first channel signal and the second channel signal but different signs of the signals, 0 representing no similarity of the first channel signal and the second channel signal at all and 1 representing equal shape of the first channel signal and the second channel signal regardless of the levels of the signals.

11. The data processing system of claim 8 wherein the processor is configured to obtain of the balance signal, the processor is configured to detect a running average of the first channel signal, the processor is configured to detect a running average of the second channel signal, the processor is configured to compare the detected running average of one of the first and second channel signal with the running average of both first and second channel signals, and the processor is configured to calculate the normalized balance signal on basis of the comparison.

12. The data processing system of claim 8 wherein the processor is configured to obtain the correlation signal, the processor is configured to detect a running average of the first channel signal, the processor is configured to detect a running average of the second channel signal, the processor is configured to detect a running average of the product of the first channel signal and the second channel signal, to compare the detected running average of the first channel signal, the running average of the second channel signal and the running average of the product of the first channel signal and the second channel signal, and the processor is configured to calculate the normalized correlation signal on basis of the comparison whereby more recent parts of the detected running averages of the first and second channel signals get higher weight while older parts get more and more reduced weight.

13. The data processing system of claim 8 wherein the processor is configured so that the first channel signal and the second channel signal are audio signals, and wherein the folded back ends of the displayed correlation signal have graphical user interface appearance different than the rest of the displayed correlation signal.

14. The data processing system of claim 8 wherein the processor is configured to provide several pairs of first and second channel signals, defining a matrix corresponding to an arrangement of channels according to surround audio format, whereby several balance and correlation signals are displayed on several scales corresponding to several pairs of first and second channel signals.

15. A data processing system for displaying balance and correlation information of at least a pair of a first channel signal and a second channel signal, comprising:
    means for obtaining by a processor a balance signal of the first channel signal and the second channel signal;
    means for obtaining by a processor a correlation signal of the first channel signal and the second channel signal;
    display means with a single scale displaying the balance signal and the correlation signal on the single scale on a display device, wherein ends of the displayed correlation signal are configured to fold back at the ends of the single scale when the correlation signal is negative.

16. The data processing system of claim 15 wherein the scale is a normalized scale having a length ranging from −1 to 1, −1 representing the balance signal being completely determined by the first channel signal, 1 representing the balance signal being completely determined by the second channel signal and 0 representing the balance signal being to the same extent determined by the first and second channel signals, and having a balance indicator on the normalized scale corresponding to a value of the balance signal to be displayed.

17. The data processing system of claim 16 wherein a correlation range indicator having a width is positioned on the normalized scale and coupled to the balance indicator, wherein the correlation range indicator is displayed along the length of the normalized scale x, wherein the width of the correlation range indicator is equal to 1-value of correlation signal wherein in case the width of the correlation range indicator exceeds the length of the normalized scale the exceeding ends of the correlation range indicator are folded back at the ends of the normalized scale and wherein the width of the correlation range indicator covers the same percentage of the length of the normalized scale from the balance indicator to either end of the normalized scale, the value of the correlation signal being normalized with a range of −1 to 1, −1 representing equal shape of the first channel signal and the second channel signal but different signs of the signals, 0 representing no similarity of the first channel signal and the second channel signal at all and 1 representing equal shape of the first channel signal and the second channel signal regardless of the levels of the signals.

18. The data processing system of claim 15 wherein the means for obtaining the balance signal further comprises detecting means for detecting a running average of the first channel signal, detecting means for detecting a running average of the second channel signal, comparator and calculating means for comparing the detected running average of one of the first and second channel signal with the running average of both first and second channel signals and for calculating the normalized balance signal on basis of the comparison.

19. The data processing system of claim 15 wherein the means for obtaining of the correlation signal further comprises detecting means for detecting a running average of the first channel signal, detecting means for detecting a running average of the second channel signal and detecting means for detecting a running average of the product of the first channel signal and the second channel signal, comparator and calculating means for comparing the detected running average of the first channel signal, the running average of the second channel signal and the running average of the product of the first channel signal and the second channel signal, and for calculating the normalized correlation signal on basis of the comparison whereby more recent parts of the detected running averages of the first and second channel signals get higher weight while older parts get more and more reduced weight.

20. The data processing system of claim 15 wherein the first channel signal and the second channel signal are audio signals, and wherein the folded back ends of the displayed correlation signal have graphical user interface appearance different than the rest of the displayed correlation signal.

21. The data processing system of claim 15 wherein several pairs of first and second channel signals are arranged so that they define a matrix corresponding to an arrangement of several channels according to surround audio format, the data processing system having several scales on which several balance and correlation signals are displayed corresponding to the several pairs of first and second channel signals.

22. A non-transitory machine-readable storage medium storing executable program instructions which cause a data processing system to perform operations comprising:
    obtaining a balance signal of the first channel signal and the second channel signal;
    obtaining a correlation signal of the first channel signal and the second channel signal;
    displaying the balance signal and the correlation signal on a single scale on a display device, wherein ends of the displayed correlation signal are configured to fold back at the ends of the single scale when the correlation signal is negative.

23. The non-transitory machine-readable storage medium of claim 22, wherein the scale is a normalized scale having a length ranging from −1 to 1, −1 representing the balance signal being completely determined by the first channel signal, 1 representing the balance signal being completely determined by the second channel signal and 0 representing the balance signal being to the same extent determined by the first and second channel signals, wherein the balance indicator corresponding to the value of the balance signal is generated and displayed on the normalized scale.

24. The non-transitory machine-readable storage medium of claim 22, wherein the correlation range indicator having a width is generated and displayed on the normalized scale and is coupled to the balance indicator, wherein the correlation range indicator is displayed along the length of the normalized scale x, wherein the width of the correlation range indicator is equal to 1-value of correlation signal, wherein in case the width of the correlation range indicator exceeds the length of the normalized scale the exceeding ends of the correlation range indicator are folded back at the ends of the normalized scale and wherein the width of the correlation range indicator covers the same percentage of the length of the normalized scale from the balance indicator to either end of the normalized scale, the value of the correlation signal being normalized with a range of −1 to 1, −1 representing equal shape of the first channel signal and the second channel signal but different signs of the signals, 0 representing no similarity of the first channel signal and the second channel signal at all and 1 representing equal shape of the first channel signal and the second channel signal regardless of the levels of the signals.

25. The non-transitory machine-readable storage medium of claim 22, wherein the obtaining of the balance signal further comprises detecting a running average of the first channel signal, detecting a running average of the second channel signal, comparing the detected running average of one of the first and second channel signal with the running average of both first and second channel signals and calculating the normalized balance signal on basis of the comparison.

26. The non-transitory machine-readable storage medium of claim 22, wherein the obtaining of the correlation signal further comprises detecting a running average of the first channel signal, detecting a running average of the second channel signal, detecting a running average of the product of the first channel signal and the second channel signal, comparing the detected running average of the first channel signal, the running average of the second channel signal and the detected running average of the product of the first channel signal and the second channel signal, and calculating the normalized correlation signal on basis of the comparison whereby more recent parts of the detected running averages of the first and second channel signals get higher weight while older parts get more and more reduced weight.

27. The non-transitory machine-readable storage medium of claim 22, wherein the first channel signal and the second channel signal are audio signals, and wherein the folded back ends of the displayed correlation signal have graphical user interface appearance different than the rest of the displayed correlation signal.

28. The non-transitory machine-readable storage medium of claim 22, wherein several pairs of first and second channel signals are provided, defining a matrix corresponding to an arrangement of channels according to surround audio format, whereby several balance and correlation signals are displayed on several scales corresponding to several pairs of first and second channel signals.

* * * * *

UNITED STATES PATENT AND TRADEMARK OFFICE
CERTIFICATE OF CORRECTION

| | | |
|---|---|---|
| PATENT NO. | : 7,949,420 B2 | Page 1 of 1 |
| APPLICATION NO. | : 11/712642 | |
| DATED | : May 24, 2011 | |
| INVENTOR(S) | : Markus Sapp | |

It is certified that error appears in the above-identified patent and that said Letters Patent is hereby corrected as shown below:

IN THE CLAIMS:

In column 9, line 2, in Claim 3, delete "-1" and insert -- 1 --, therefor.

Signed and Sealed this
Twenty-ninth Day of November, 2011

David J. Kappos
*Director of the United States Patent and Trademark Office*